United States Patent [19]

Aoi et al.

[11] Patent Number: 4,962,675
[45] Date of Patent: Oct. 16, 1990

[54] SHIFTING DEVICE FOR LAWN MOWER AND THE LIKE

[75] Inventors: Kazuo Aoi; Takanori Suzuki, both of Iwata, Japan

[73] Assignee: Yamaha Hatsudoki Kabushiki Kaisha, Iwata, Japan

[21] Appl. No.: 325,305

[22] Filed: Mar. 17, 1989

[30] Foreign Application Priority Data

Mar. 18, 1988 [JP] Japan ................................. 63-65372

[51] Int. Cl.$^5$ ........................ G05G 7/00; F16D 31/02
[52] U.S. Cl. .................................. 74/473 R; 60/487; 60/494
[58] Field of Search ............... 74/473 R, 474; 60/487, 60/494

[56] References Cited

U.S. PATENT DOCUMENTS 3,609,973 10/1971 Nagano et al. ...................... 60/487
3,898,891 8/1975 Colloton ............................. 74/474
4,064,769 12/1977 Amdall et al. .................... 74/474 X Primary Examiner—Allan D. Herrmann
Attorney, Agent, or Firm—Ernest A. Beutler

[57] ABSTRACT

An improved shifting device for the hydrostatic transmission of a lawn tractor or the like. The shifting device includes means for permitting a greater latitude of movement of the shift lever without effecting either forward or reverse movement. This is done by incorporating a linkage system for interconnecting the shift lever with the transmission control that includes a lost motion connection and by providing a leak path in the hydrostatic transmission so that a greater than normal pressure must be exerted before drive in one direction is possible.

10 Claims, 7 Drawing Sheets

SHIFTING DEVICE FOR LAWN MOWER AND THE LIKE

BACKGROUND OF THE INVENTION

This invention relates to a shifting device for a lawn mower and the like and more particularly to an improved shifting device for a hydraulic transmission wherein there is a wider range of neutral movement provided so as to avoid the likelihood of improper or premature shifting into a drive mode.

Many types of vehicles are operated by hydrostatic transmissions because these devices offer very compact and effective operation. With a hydrostatic transmission, there is provided a fluid pump that is driven by the internal combustion engine and which drives a fluid motor for powering the vehicle. In many forms of application, there is also incorporated a power takeoff that is driven by the engine for driving an accessory such as a lawn mower or the like. As has been noted, the use of a hydrostatic transmission has a number of advantages for this purpose. Normally, the hydrostatic transmission is operated by a shift lever that is moveable from a neutral position to a forward position or to a reverse position. The degree of movement from the neutral position to either of the driving positions is effective to increase the speed of movement in each direction. Hence, such devices are extremely simple and advantageous.

These devices have, however, some disadvantages and these disadvantages may be understood by reference to FIG. 1 wherein the relationship between the movement of the shift lever and the operation of the hydrostatic transmission is depicted. The movement of the shift lever is shown on the ordinate while the transmission operation is shown on the abscissa. It should be noted that movement of the shift lever generally affects operation of the transmission in a linear fashion. Of course, there is a certain range wherein the transmission does not generate sufficient power so as to operate the vehicle and this is indicated by the parallel dot-dash lines indicating a lull. This is equivalent to movement of the shift lever through the distance N1. However, it should be noted that the operation is relatively sensitive and any misadjustment in the transmission control mechanism or inadvertent operation of the shift lever by the operator is likely to cause movement of the vehicle which could be undesirable.

It is, therefore, a principal object of this invention to provide an improved shifting device for a hydrostatic transmission.

It is a further object of this invention to provide a shifting device for a hydrostatic transmission wherein the linkage adjustment is not as critical and inadvertent movement of the shift lever is not likely to cause unexpected movement of the powered vehicle.

In accordance with one feature of the invention, the linkage system interconnecting the transmission with the shift lever can be designed so as to provide an area wherein movement of the shift lever does not effect automatic operation of the transmission. Although such an arrangement is effective, there is only a certain amount of tolerable lost motion or free play in the shift mechanism.

It is, therefore, a still further object of this invention to provide an improved transmission control mechanism for a hydrostatic transmission that includes a hydraulic arrangement for limiting the power buildup in at least one direction so as to create a dwell before the transmission will start to operate the vehicle even though the shift lever has been moved toward the operating position.

SUMMARY OF THE INVENTION

This invention is adapted to be embodied in a shifting device for a hydrostatic transmission that is operable between a forward position, a neutral position and a reverse position. A shift lever is incorporated that is moveable through a range of positions from a forward area to a neutral area to a reverse area. Control means are operative to pressurize a first conduit to effect forward operation and a second conduit to effect reverse operation and this control means is interconnected to the shift lever. In accordance with the invention, means re provided to prevent pressurization of at least one of the conduits upon movement of the shift lever through a range of movement so as to retard operation of the transmission in that direction.

In accordance with one feature of the invention, the retarding means is provided by incorporating a lost motion connection in the means that connects the shift lever to the control means.

In accordance with another feature of the invention, the means for precluding the operation of the transmission is effective to reduce the pressure in the one conduit upon the movement of the control means in the respective direction so as to retard operation of the transmission in that one direction.

DETAILED DESCRIPTION OF THE PREFERRED EMBODIMENT OF THE INVENTION

Figure 1:
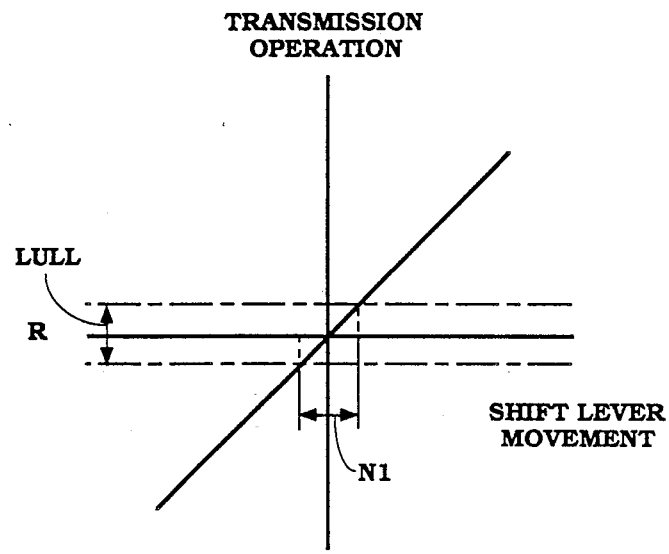
FIG. 1 is a graphical view showing a shift mechanism constructed in accordance with the prior art and the relationship of the operation of the shift lever to the transmission.
Figure 2:
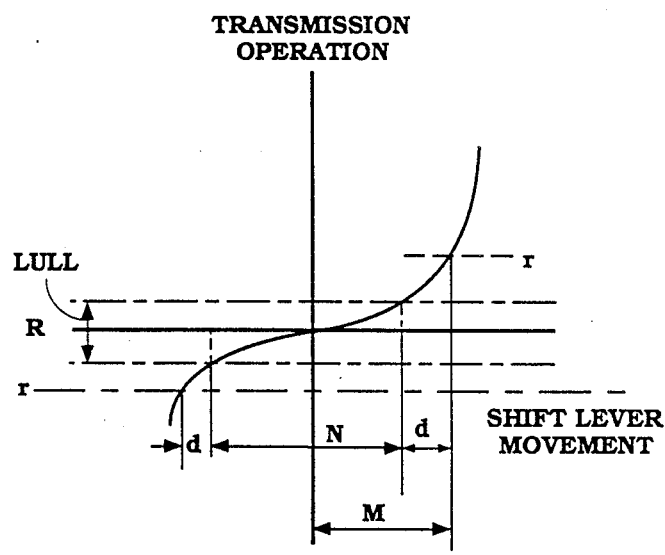
FIG. 2 is a graphical view showing the relationship of the shift lever movement to the transmission operation in accordance with an embodiment of the invention.

Before describing the actual construction of the device, the principle of operation will be described by particular reference to FIG. 2. FIG. 2 is a graphical analysis which can be compared with FIG. 1 and shows the relationship between the shift lever movement and the transmission operation. It will be noted from the curved line that the movement of the shift lever through the neutral range N is substantially greater than with prior art constructions before the transmission develops sufficient output to operate the vehicle in either direction. This is because there is a lost motion type connection in the linkage system that interconnects the shift lever with the transmission. In addition, the transmission incorporates a valve which is operative in the reverse direction so as to create a delay period wherein pressure must rise to the point shown by the line r before the transmission will generate sufficient output so as to effect movement in the reverse mode. This is accomplished, in the illustrated embodiment, by providing a small leak path in the reverse pressure conduit. As a result, the movement from the central position to the point where actual reverse operation begins is expanded by the amount d so as to offer further reduction in sensitivity of transmission operation. A similar arrangement could also be incorporated in the forward direction but this would limit the maximum forward thrust of the vehicle, which may be undesirable in some applications.

Figure 3:
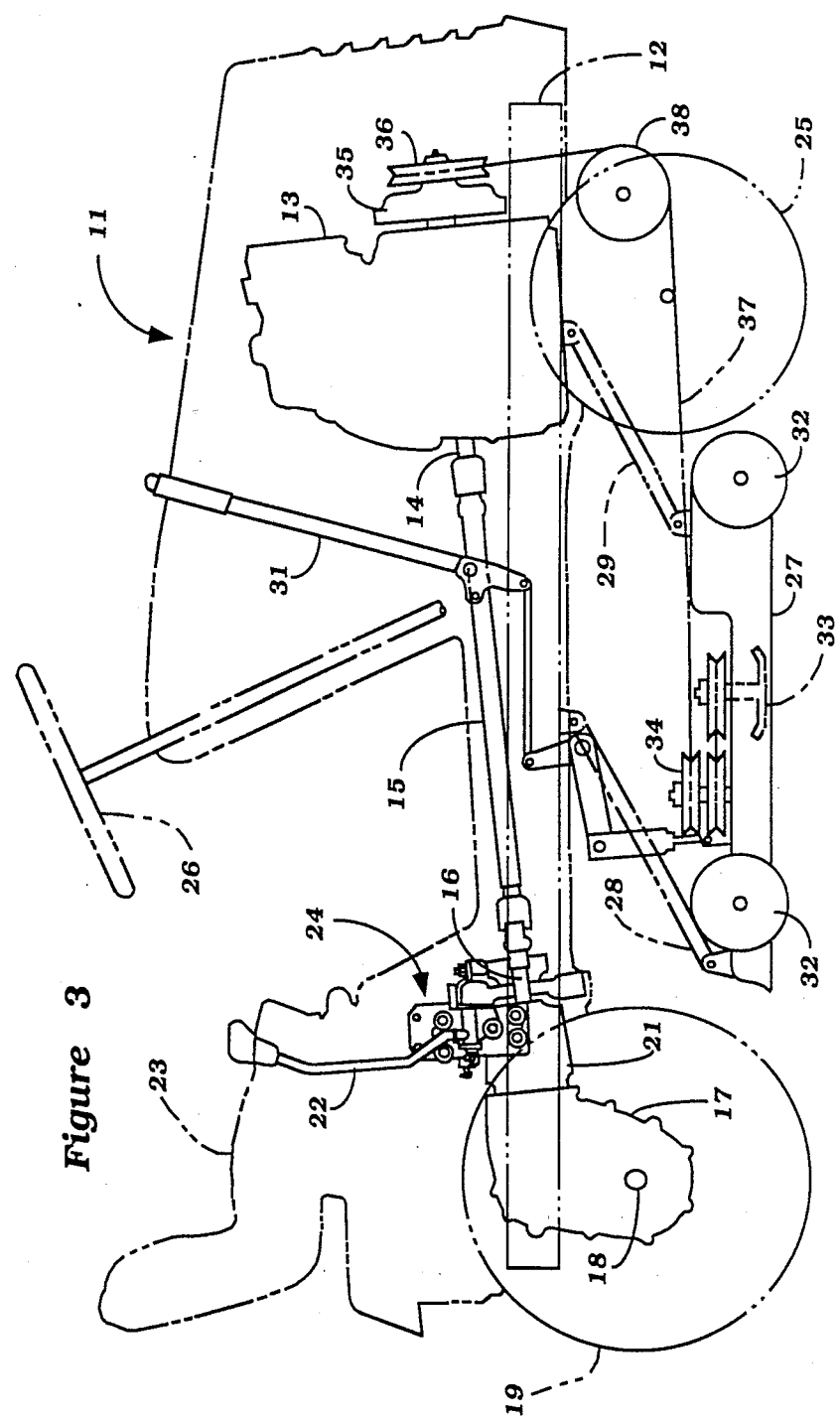
FIG. 3 is a side elevational view of a tractor with a lawn mower attachment that is constructed in accordance with an embodiment of the invention with portions of the tractor being shown in phantom.

Referring now in detail to the specific embodiment and initially to FIG. 3, a lawn or garden tractor a riding mower constructed in accordance with an embodiment of the invention is identified generally by the reference numeral 11. The tractor mower 11, which is a typical environment in which the invention may be practiced, is comprised of a frame 12 that mounts an internal combustion engine 13 of any known type. The engine 13 has an output shaft 14 that is coupled by a drive shaft 15 to an input shaft 16 of a hydrostatic drive, indicated generally by the reference numeral 21. The hydrostatic drive 21 includes, as will be described later, a fluid pump of the swash plate type so as to vary the output of the pump and a fluid motor that is driven by the pump. This fluid motor is drivingly coupled by a final drive 17 to a rear axle 18 for driving the rear wheels 19 of the tractor in a known manner. The hydrostatic drive 21 includes a swash plate control mechanism 20 of a known type (FIG. 7) which is controlled by means of a shift lever 22 that is positioned in proximity to the rider's seat 23. The shift lever 22 is interconnected to the swash plate control mechanism 20 by a control linkage, indicated generally by the reference numeral 24.

A pair of dirigible front wheels 25 are supported at the forward end of the frame 12 in a known manner and are steered by means of a steering wheel 26 that is positioned forwardly of the rider's seat 23.

The tractor 11 may serve any of a wide variety of purposes and is depicted as being of the lawn mower type and carries a lawn mower attachment, indicated generally by the reference numeral 27 that is supported beneath the frame 12 by a parallel linkage system 28 and 29. The height of the lawn mower attachment 27 may be adjusted by a control lever 31 and the lawn mower attachment when engaged with the ground rides along the ground on a pair of wheels 32.

The lawn mower attachment has a pair of cutter blades 33, only one of which appears in the flange, that are driven by a pulley mechanism 34. The pulley mechanism 34 is driven from the engine output shaft 14 by means of an electrically operated clutch 35 that couples the output shaft 14 to a driven pulley 36. A driving belt 37 transfers drive from the driven pulley 36 to the pulley assembly 34 along a path that includes a belt tensioner 38.

It should be understood that the construction as thus far described may be considered to be conventional except as will be hereinafter be noted.

Figure 4:
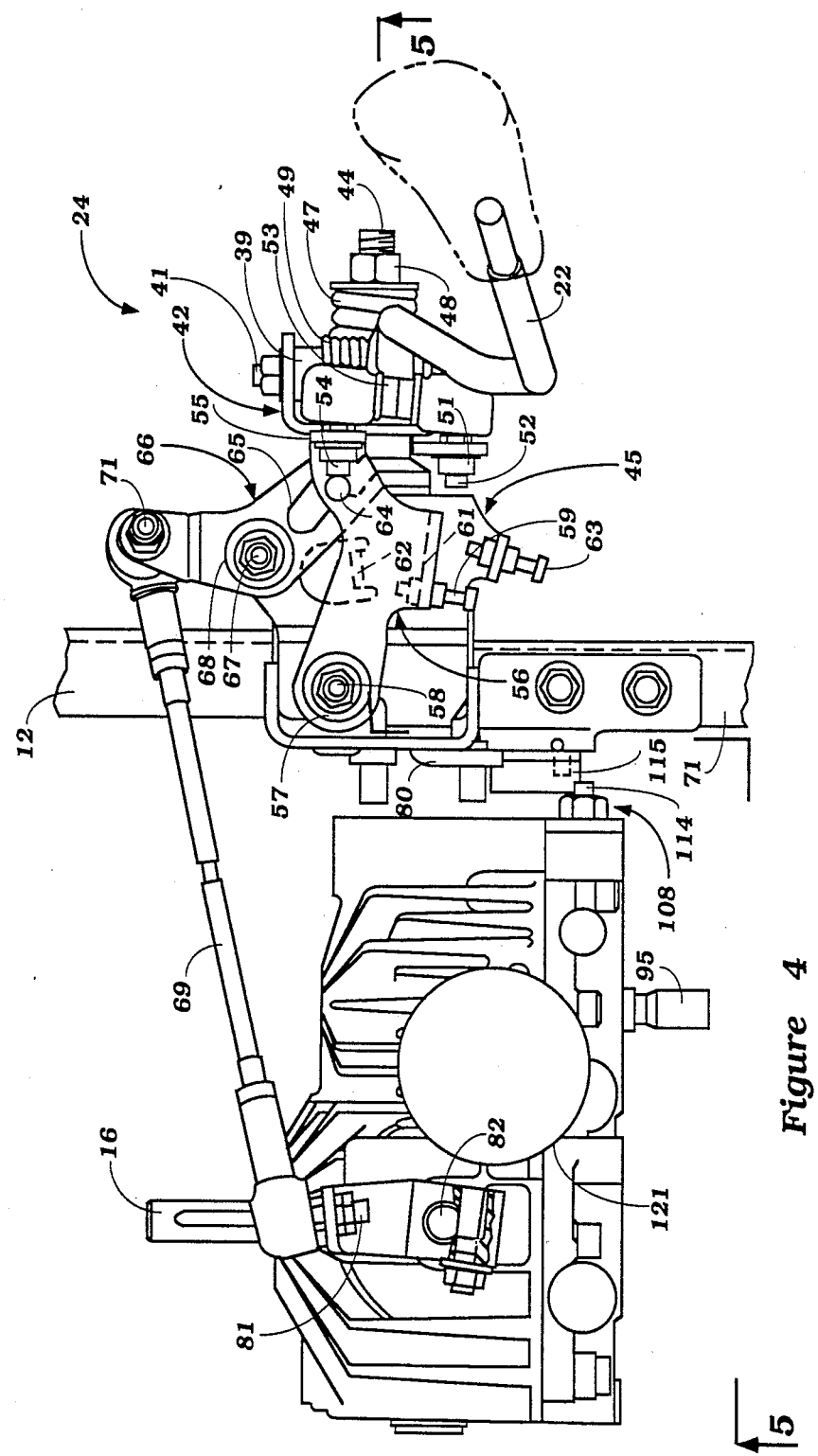
FIG. 4 is an enlarged top plan view showing the interconnection between the shift lever and the transmission mechanism.
Figure 5:
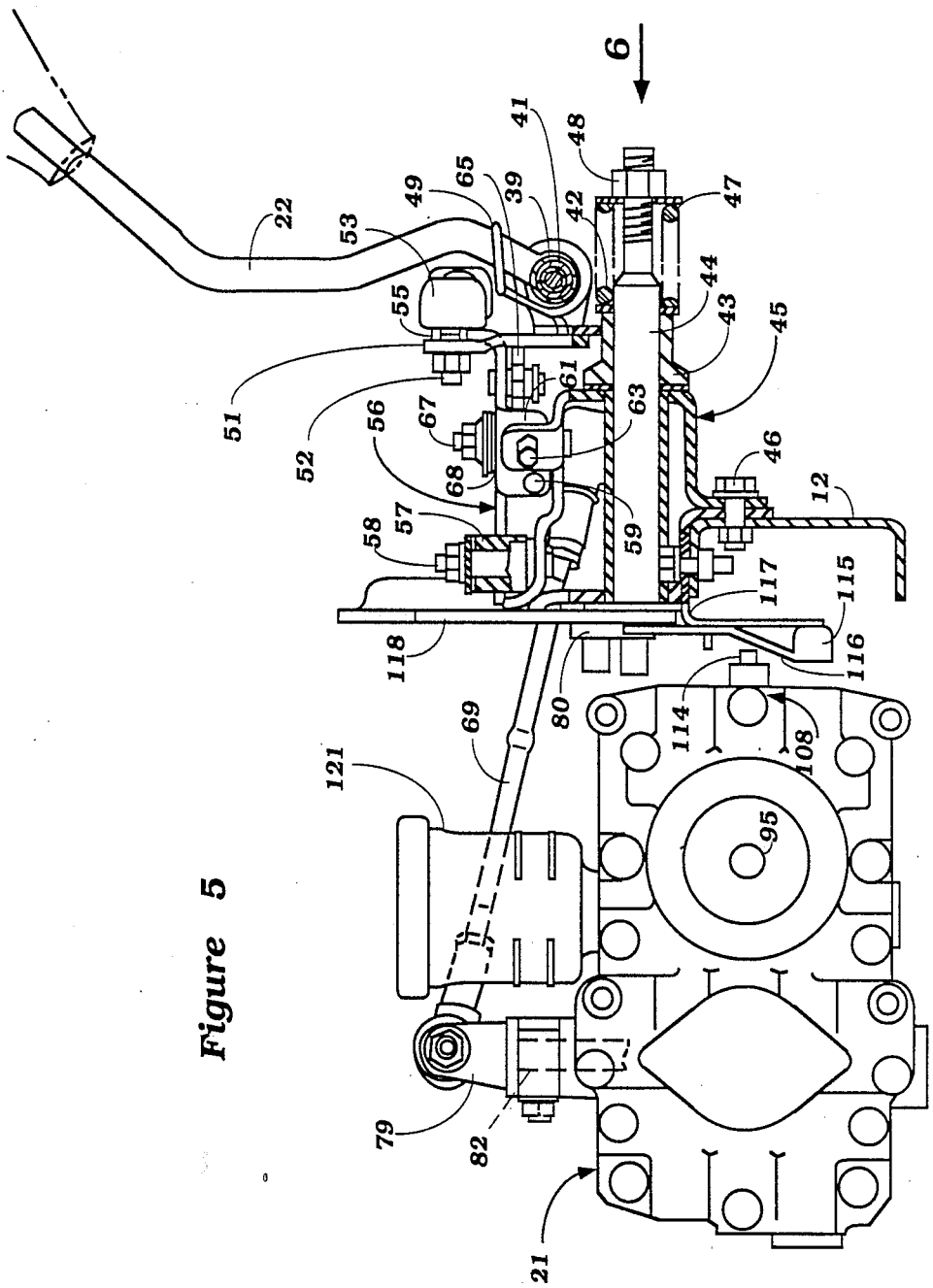
FIG. 5 is a cross-sectional view taken along the line 5—5 of FIG. 4.
Figure 6:
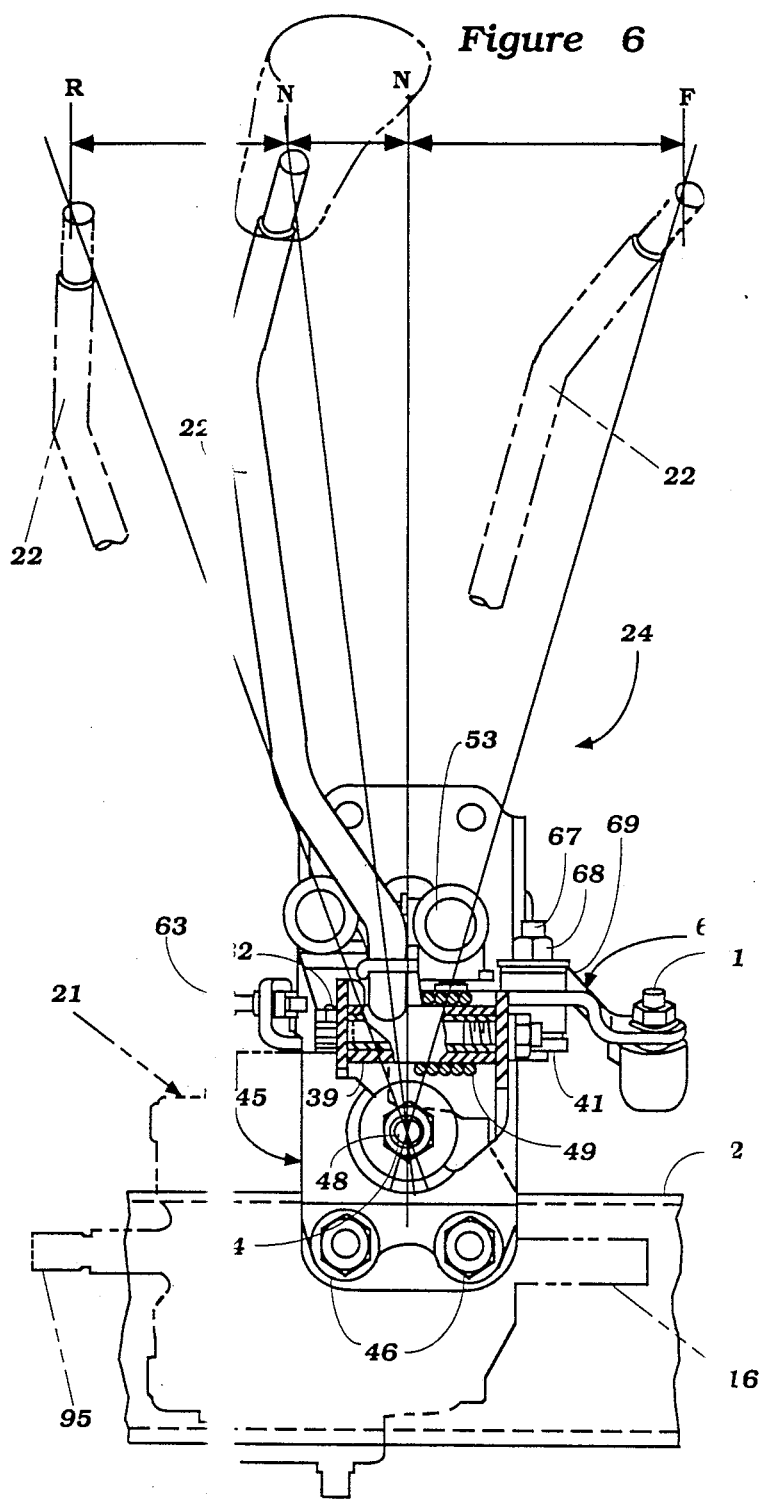
FIG. 6 is an end elevational view of the transmission and control mechanism and is taken generally in the direction of the arrow 6 in FIG. 5.

Referring now to FIGS. 4 through 6, the shift lever 22 has a generally tubular base 39 that is journaled upon a pivot shaft 41. The pivot shaft 41 is, in turn, affixed to a pair of outstanding ears formed in a bracket assembly 42. The bracket assembly 42 is, in turn, affixed to an annular hub 43 which has a splined connection to a pivot shaft 44 that is journaled on a mounting bracket assembly 45. The bracket assembly 45 is, in turn, affixed to the frame 12 by means of fasteners 46.

It should be noted that the aforedescribed construction permits the shift lever 22 to be pivoted about a rotational axis defined by the shaft 44 as shown in FIG. 6 from the neutral position to a full forward and full reverse position as shown in the phantom lines. The support bushing 43 for the shift lever 22 may move to a limited extent axially along the shaft 44 and a coil compression spring 47 that is held under tension by a locking nut 48 normally resists this axial movement.

In addition to being axially moveable along the shaft 44, the shift lever 22 may also pivot about the pivot shaft 41. A torsional spring 49 is interengaged between the shift lever 22 and the bracket 42 so as to yieldably resist pivotal movement about the pivot shaft 41.

The bracket 42 has an upstanding arm 51 that carries a spherical joint 52 to provide a universal connection to one end of a shift link 53. The forward end of the shift link 53 has a similar spherical connection 54 to an upstanding flange 55 of a shift lever, indicated generally by the reference numeral 56. The lever 56 has a journal portion 57 that is rotatably journaled on a pin 59 which is, in turn, carried on the supporting bracket 45.

The extreme pivotal ranges of movement of the shift control lever 56 are controlled by means of a first adjustable stopper 59 that is carried by a depending flange 61 of the shift lever 56 and which cooperates with a fixed adjustment 62 formed on the supporting bracket 45. Movement in the opposite direction is limited by the contact of the flange 61 with an adjustable stopper 63 that is fixed in an upstanding flange of the supporting bracket 45.

The shift lever 56 carries a follower pin 64 that is received within a generally Z-shaped cam slot 65 formed in a second shift lever 66. This second shift lever 66 is rotatably journaled on the supporting bracket 45 by means of a pivot pin 67 that is received within a journaling boss portion 68 of the shift lever 66.

The configuration of the cam slot 65 and its relation to the movement of the follower pin 64 is such so as to give the relationship as shown in FIG. 2. That is, the central portion of the Z cam slot 65 is configured so that there will be in effect a dwell period during the movement of the shift lever 22 and shift lever 56 before the shift lever 66 is pivoted. As a result, the actual setting of the neutral position will be less critical than with previously proposed constructions.

The action of the spring 47 on the shift lever hub 43 urges the hub into frictional engagement with the bracket 45 to frictionally retain the shift mechanism in the selected position without interfering with the shifting movement.

The second shift control lever 66 is formed as a bell crank with the cam slot 65 being formed in one of its arms. A control rod or link 65 is pivotally connected at one end to this other arm by means of a spherical joint 71. The opposite end of the link 69 is connected to a control lever 79 by means of a spherical joint 81. The control lever 79 is affixed to a transmission control shaft 82 that is coupled in a suitable manner to a swash plate assembly 83 (FIG. 7) of the hydrostatic transmission 21.

There is provided a neutral lever 80 that is affixed to the inner end of the shaft 44 and which is cooperable with a brake mechanism (not shown) for returning the shift lever 22 to the neutral position when the brake of the vehicle has been actuated so as to avoid the brake having to work against the driving force through the transmission 21.

Figure 7:
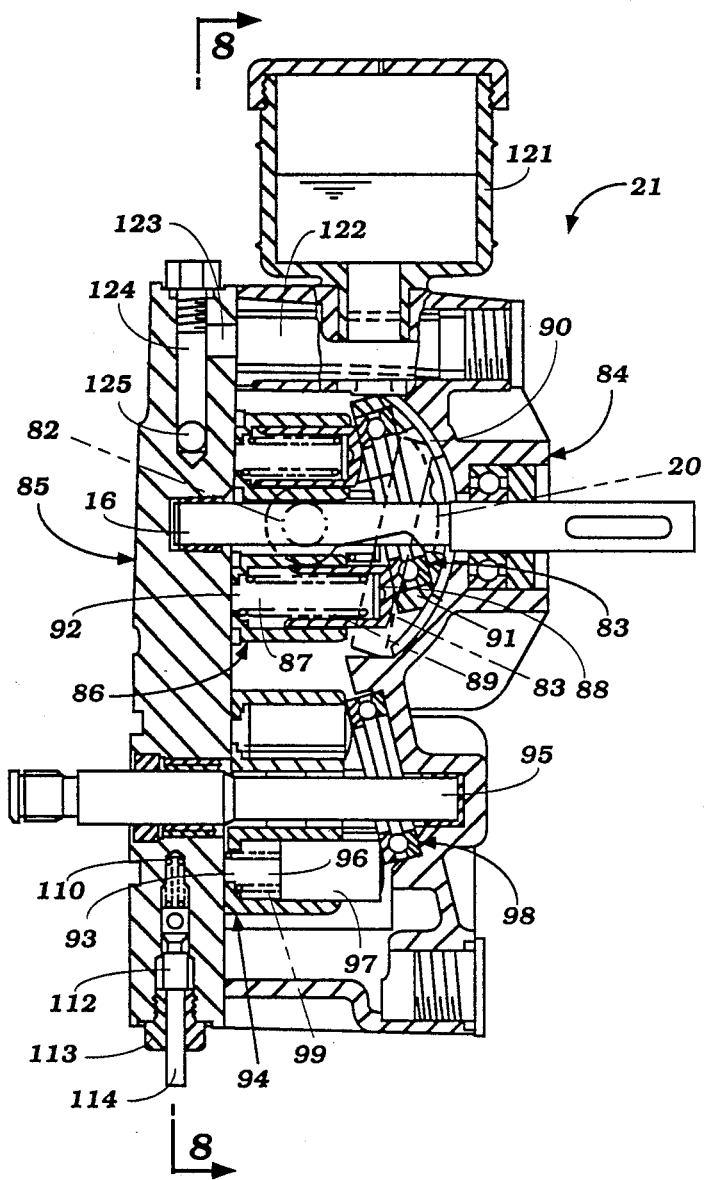
FIG. 7 is a cross-sectional view taken through the hydrostatic transmission of the vehicle with the reservoir shown out of position so as to indicate how it cooperates in the system.
Figure 8:
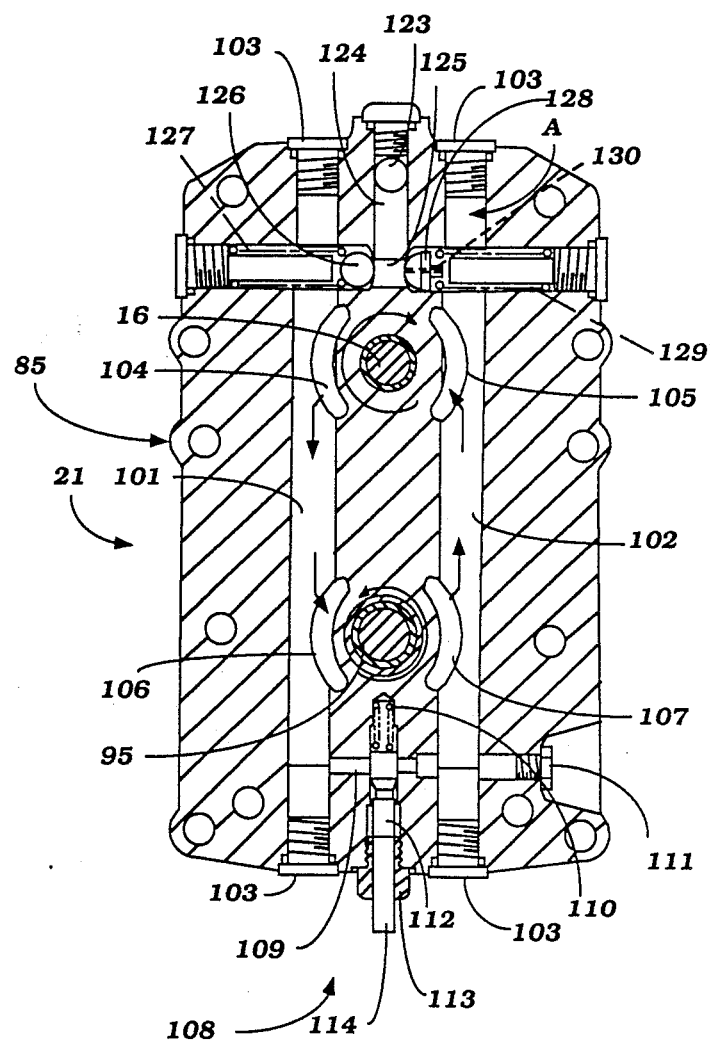
FIG. 8 is a cross-sectional view taken along the line 8—8 of FIG. 7.

Referring specifically to FIGS. 7 and 8, the hydrostatic transmission 21 is comprised of a main housing portion 84 that is closed by a cover plate 85. The input shaft 16 is journaled within this assemblage and has affixed to it a pump cylinder assembly 86 that rotates with the input shaft 16 and which forms a plurality of cylinder bores 87 that extend generally parallel to the axis of rotation of the shaft 16. Pistons 8 are slidably supported within the bores 87 and are urged by coil compression springs 89 into engagement with the swash plate assembly 83. The swash plate assembly 83 includes a control ring 91 that engages a spherical bearing 90 formed in the pump housing member 84 so that the swash plate 83 may be rotated from the forward drive position as shown in the solid line view of FIG. 7 to the full reverse direction as shown in the phantom line position of this figure upon operation of the swash plate control mechanism 20.

Depending upon the angular inclination of the swash plate 83, one of two conduits, to be described, formed in the end plate 85 is pressurized and the other of these conduits is depressurized so as to provide a return conduit. The flow takes place to and from ports 92 formed in the cylinder block 86 in registry with each of the respective cylinder bores 87. This pressure is delivered to corresponding ports 93 formed in a second motor cylinder block 94 which is also journaled within the pump housing 84. The cylinder block 94 is affixed for rotation with an output shaft 95 that is journaled within the housing 84 and cover plate 85 and which provides an input shaft to the final drive 17 of the tractor 11.

The cylinder block 94 is formed with a plurality of cylinder bores 96 in which pistons 97 are slidably supported. The pistons 97 are held into engagement with an angularly disposed thrust bearing 98 by means of coil compression springs 99. Depending upon the degree of timing of pressurization of the ports 93, the cylinder block 94 and shaft 95 will be driven in either forward or reverse directions at a predetermined speed ratio relative to the input shaft 16.

Referring now to FIG. 8, the porting arrangement for the hydrostatic transmission 21 is illustrated. This porting arrangement includes a parallel pair of flow passages 101 and 102 that extend through the cover plate 85 and which are closed at their opposite ends by plugs 103. At one end, the passages 101 and 102 are connected by arcuate ports 104 and 105 to an area that registers with the ports 92 of the cylinder block 86 so as to sequentially receive fluid from these ports and to return fluid to it, depending upon the direction of rotation. In the illustrated embodiment, the input shaft 16 is rotating in a clockwise direction (its normal direction of rotation) and the swash plate mechanism 83 is positioned for forward drive so that the port 104 and passage 101 are pressurized. The port 105 and passage 102 act as return paths.

At the lower end of the passages 101 and 102 there are provided a second pair of ports 106 and 107 that communicate with the ports 93 of the cylinder block 94. When the passage 101 is pressurized, the port 106 will be an inlet port and the port 107 will be an outlet port and the output shaft 95 will be rotated in a counterclockwise or forward drive mode. In the event the swash plate 83 is rotated for reverse drive, the shaft 16 will continue to rotate in the clockwise direction but now the port 105 will be an outlet port and the passage 102 will be the supply port while the passage 101 will act as a return passage and the port 104 acts as a return port. Under this condition, the ports 93 of the cylinder block 94 are pressurized through the port 107 and the port 106 acts as a return port. The output shaft 95 will then be rotated in a clockwise direction which is the reverse drive mode.

In addition to the neutral condition which may be achieved by appropriately positioning the swash plate 83, there is also provided a neutral bypass valve, indicated generally by the reference numeral 108. This neutral bypass valve 108 may be open so as to permit free communication between the passages 101 and 102. When this occurs the tractor 11 may be towed without resistance from the transmitter 21 and engine 13.

The neutral valve 108 controls the flow through a bypass passageway 109 that is drilled through one side of the cover plate 85 and across the passages 101 and 102 and which is closed by a closure plug 111. A valve element 112 is slidably supported in a bushing 113 that is received in a tapped opening and which is normally urged by a coil compression spring 110 to a closed position as shown in FIG. 8. The valve element 112 has a projecting head portion 114 that can be depressed, in a manner to be described, so as to open the valve 108 and permit communication between the passageways 101 and 102 for the purposes as a forenoted.

As may be seen in FIGS. 4 and 5, the projecting valve portion 114 is juxtaposed to a cam plate 115 that has a cam portion 116 which is adapted to engage the plunger portion 114 when the cam plate 115 is slid upwardly. The cam plate 115 is supported from this sliding movement by means of a plate 117 that is carried by the frame 12. The cam plate 115 is operated by means of a neutral release lever 118 so as to accomplish the aforenoted neutral action.

In order to permit make up fluid to flow into the hydrostatic transmission, there is provided an external reservoir 121 that communicates with the main housing portion 84. A passageway 122 in the main housing communicates the fluid from the reservoir 121 with a further passageway 123 formed in the end plate 85. The passageway 123 communicates with a radially extending passageway 124 which, in turn, communicates at its inner end with a cross passageway 125. The cross passageway 125 can communicate with the passage 101 through a ball type check valve 126 that is normally held in a closed position by a spring 127. In a like manner, the passageway 125 can communicate with the passageway 102 by means of a check valve 128 that is normally held in a closed position by means of a spring 129.

It should be noted that when fluid is depleted from the passage 102 when operating in the forward direction, the pressure difference on the ball check valve 128 will cause it to open and draw make up fluid from the main housing 84. In a like manner, when operating in the reverse mode if fluid make up is required, it will be drawn by opening the valve 126 so as to permit make up fluid to be drawn into the passageway 102 from the main housing 84.

As has been noted, it is desirable to provide some latitude in movement of the shift lever 22 in its neutral range before forward or reverse drive are effected. The cam 64 and slot 65 arrangement of the motion transmitting mechanism 24 that accomplishes lost motion does permit such latitude. In addition, by providing a restricted passageway 131 through the check valve 128, some leakage in the path 102 is provided. This fluid leakage will return either to the main housing 84 or back to the passageway 101 depending upon the amount of fluid in the system. This leakage occurs when the shift lever 22 has been shifted to the reverse range and because of it, it will be necessary to move the lever 22 further in the reverse direction as shown by the dimension d in FIG. 2 so that the pressure can be built up the point r to generate sufficient power to the output shaft 95 to effect reverse operation. As a result, it should be apparent that the neutral range is significantly increased by means of this arrangement and the advantages as aforenoted are obtained.

It should be readily apparent from the foregoing description that the embodiment of the invention as illustrated and described is particularly advantageous in insuring that the neutral condition of the transmission will not be so sensitive of the position of the shift lever 22 as to cause any difficulties in operation. The construction, however, provides a very efficient hydrostatic transmission and shifting arrangement and thus achieves the results as desired.

Although an embodiment of the invention has been illustrated and described, various changes and modifications may be made without departing from the spirit and scope of the invention, as defined by the appended claims.

We claim:

1. In a shifting device for shifting a hydrostatic transmission between a forward position, a neutral position and a reverse position comprising a shift lever moveable through a range of positions from a forward through a neutral area to a reverse area, control means for pressurizing a first conduit to effect forward operation of said transmission and a second conduit to effect reverse operation of said transmission, and means for operating said control means to pressurize said first conduit upon movement of such shift lever from said neutral area into said forward area and said control means to pressurize said second conduit upon movement of said shift lever from said neutral area into said reverse area, the improvement comprising means for delaying the operation of said transmission into at least one of its drive modes upon movement of the shift lever from its neutral position for a predetermined degree of movement toward that drive mode selecting position.

2. In a shifting device as set forth in claim 1 wherein the delaying means comprises means in the means for operating the control means.

3. In a shifting device as set forth in claim 2 wherein the means for operating the control means comprises a linkage means interconnecting the shift lever to the control means.

4. In a shifting device as set forth in claim 3 wherein the linkage means includes means providing a lost motion connection operative in the movement of the shift lever relative to the control means.

5. In a shifting device as set forth in claim 4 further including means for reducing the pressure rise in at least one of said conduits upon movement of the shift lever from its neutral area into the area of said shift where the conduit is pressurized.

6. In a shifting device as set forth in claim 5 wherein the means for reducing the pressure rise comprise a leak path from the one conduit.

7. In a shifting device as set forth in claim 6 wherein the leak path is from the conduit for effecting reverse operation.

8. In a shifting device for shifting a hydrostatic transmission between a forward position, a neutral position and a reverse position comprising a shift lever moveable through a range of positions from a forward through a neutral area to a reverse area, control means for pressurizing a first conduit to effect forward operation of said transmission and a second conduit to effect reverse operation of said transmission, and means for operating said control means to pressurize said first conduit upon movement of such shift lever from said neutral area into said forward area and said control means to pressurize said second conduit upon movement of said shift lever from said neutral area into said reverse area, the improvement comprising means for delaying the operation of said transmission into at least one of its drive modes upon movement of the shift lever toward that drive mode selecting position comprising means for reducing the pressure rise in at least one of the conduits upon movement of said shift lever from its neutral area into the area of said shift lever where the conduit is pressurized.

9. In a shifting device as set forth in claim 8 wherein the means for reducing the pressure rise comprises a leak path from the one conduit.

10. In a shifting device as set forth in claim 9 wherein the leak path is from the conduit for effecting reverse operation.

* * * * *